(12) United States Patent
Moreno

(10) Patent No.: US 8,502,823 B2
(45) Date of Patent: Aug. 6, 2013

(54) METHOD AND SYSTEM FOR LANE GRAPH VISUALIZATION

(75) Inventor: Camilo Arango Moreno, Mountain View, CA (US)

(73) Assignee: Business Objects Software Limited, Dublin (IE)

( * ) Notice: Subject to any disclaimer, the term of this patent is extended or adjusted under 35 U.S.C. 154(b) by 798 days.

(21) Appl. No.: 12/642,903

(22) Filed: Dec. 21, 2009

(65) Prior Publication Data
US 2011/0148879 A1    Jun. 23, 2011

(51) Int. Cl.
- G06T 11/20  (2006.01)
- G06F 3/01   (2006.01)
- G06F 3/048  (2006.01)

(52) U.S. Cl.
USPC ............................ 345/440; 715/762; 715/769

(58) Field of Classification Search
None
See application file for complete search history.

(56) References Cited

U.S. PATENT DOCUMENTS

| | | | |
|---|---|---|---|
| 5,295,243 | A | 3/1994 | Robertson et al. |
| 5,590,250 | A | 12/1996 | Lamping et al. |
| 5,619,632 | A | 4/1997 | Lamping et al. |
| 6,901,555 | B2 | 5/2005 | Hida et al. |
| 7,853,930 | B2 * | 12/2010 | Mitchell et al. ............... 717/131 |
| 2007/0214136 | A1 * | 9/2007 | MacLennan et al. ............. 707/6 |
| 2009/0125846 | A1 * | 5/2009 | Anderson et al. ............. 715/853 |

OTHER PUBLICATIONS

Anonymous; Adjacency matrix; Wikipedia, the free encyclopedia (http://en.wikipedia.org/wiki/Adjacency_matrix), Jun. 2003.

John Lamping, Ramana Rao, and Peter Pirolli; A Focus+Context Technique Based on Hyperbolic Geometry for Visualizing Large Hierarchies; Proceedings of the SIGCHI conference on Human factors in computing systems; 1995; pp. 401-408; (http://www.ramanarao.com/papers/startree-chi95.pdf).

Vitaly Friedman; Data Visualization: Modern Approaches; Smashing Magazine; Aug. 2, 2007(http://www.smashingmagazine.com/2007/08/02/data-visualization-modern-approaches/).

Zequan Shen and Kwan-Liu Ma; Path Visualization for Adjacency Matrices; Proceedings of Eurographics/ IEEE-VGTC Symposium on Visualization (2007) (http://vis.cs.ucdavis.edu/~shenz/eurovis/pathvis_eurovis07.pdf).

Vitaly Friedman; Data Visualization and Infographics; Smashing Magazine; Jan. 14, 2008 (http://www.smashingmagazine.com/2008/01/14/monday-inspiration-data-visualization-and-infographics/).

Michael Friendly and Daniel J. Denis ; Milestones in the history of thematic cartography, statistical graphics, and data visualization, 2001 (http://www.math.yorku.ca/SCS/Gallery/milestone/).

(Continued)

*Primary Examiner* — Joni Richer
*Assistant Examiner* — Michelle Chin

(57) ABSTRACT

A system and method for lane graph visualization are described. In various embodiments, a system includes modules to receive and display nodes in topological order. In various embodiments, the system determines a structure for nodes and sorts the data nodes. In various embodiments, a user interface is provided for displaying the lane graph visualization. In various embodiments, the user interface offers interactivity features responsive to user interface events. In various embodiments, a method for lane graph visualization is presented. The method includes receiving nodes in topological order and displaying the nodes in a lane graph visualization. In various embodiments, the method provides interactivity features for the lane graph visualization.

18 Claims, 9 Drawing Sheets

OTHER PUBLICATIONS

Rika Furuhata; Information Visualization and Visualization Techniques: A Collection of Visualizations; Fujishiro Ichikawa Lab. 2000 (http://pfp7.cc.yamaguchi-u.ac.jp/~ichikawa/iv/index.html).

Rika Furuhata; Information Visualization and Visualization Techniques: A Collection of Visualizations; 7a: Tree; Fujishiro Ichikawa Lab. 2000 (http://pfp7.cc.yamaguchi-u.ac.jp/~ichikawa/iv/07a.htm).

Rika Furuhata; Information Visualization and Visualization Techniques: A Collection of Visualizations; 7b ConeTree; Fujishiro Ichikawa Lab. 2000 (http://pfp7.cc.yamaguchi-u.ac.jp/~ichikawa/iv/07b.htm).

Rika Furuhata; Information Visualization and Visualization Techniques: A Collection of Visualizations; 14: Other techniques; Fujishiro Ichikawa Lab. 2000 (http://pfp7.cc.yamaguchi-u.ac.jp/~ichikawa/iv/14.htm).

SAP Design Guild Team; Visualization—New Controls and Applications; Feb 11, 2008; SAP AG, Germany (http://www.sapdesignguild.org/community/book_people/visualization-controls.asp).

* cited by examiner

METHOD AND SYSTEM FOR LANE GRAPH VISUALIZATION

TECHNICAL FIELD

The invention relates generally to visualizing data dependencies, and more specifically, to lane graph visualization.

BACKGROUND

Graphs are often used to represent, analyze, or process data. Graphs are used to represent abstract representation of a set of elements, referred to as "nodes." Nodes are typically related to each other. These relationships are represented as links between the nodes, referred to as "edges."

Data visualization refers to representing information in a graphical way, so that a user is able to understand the information, analyze the information, and draw conclusions from the information.

A graph may be used to build a model of a data structure. The model may include items of data represented by nodes and edges connecting the nodes. If there is no distinction in the direction of every edge in a graph, the graph is undirected. If some edge in a graph is directed from one node to another node, the graph is directed and all other edges in the graph are required to have a direction. An undirected graph can be transformed into a directed graph by replacing each edge of the undirected graph with two directed edges between the same nodes that are in opposite directions, i.e. replace each undirected edge, for example, between nodes 'a' and 'b,' with an edge directed from 'a' to 'b' and with a second edge directed from 'b' to 'a.' Such models of data structures may be used for computational purposes, analysis, and optimization.

Some practical applications of graphs include computer networks, statistics, data structures, organizational structures, and studying particles in the natural sciences, among others.

Data structures may have many nodes, for example, hundreds, thousands, or even hundreds of thousands of nodes. Thus, it may be difficult to visualize a graph in a readable way. However, a visualization may be important for decision making and thus it is necessary to provide clear and readable graphs. Some visualization techniques suffer from poor readability as a result of crossing lines or overlapping content due to the size and complexity of the graph. It also may be beneficial for graphs to provide additional functionality so that users can obtain additional detail about the graph structure.

SUMMARY

These and other benefits and features of embodiments of the invention will be apparent upon consideration of the following detailed description of preferred embodiments thereof, presented in connection with the following drawings.

In various embodiments, a system is presented. In various embodiments, the system may be implemented to analyze and display dependencies in structured data.

In various embodiments, a system of the embodiments may receive structured data from a memory and display the dependencies between the nodes of the data in a user interface.

In various embodiments, a system of the embodiments may alternately show the flow of dependencies in a descending order or in an ascending order or in both orders.

In various embodiments, parts of the dependencies between data elements may be collapsed, expanded, or highlighted depending on selections received in the user interface.

In various embodiments, a method is presented. The method may receive structured data from one or more modules and display dependencies between the nodes of the data in a lane graph visualization in a user interface.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
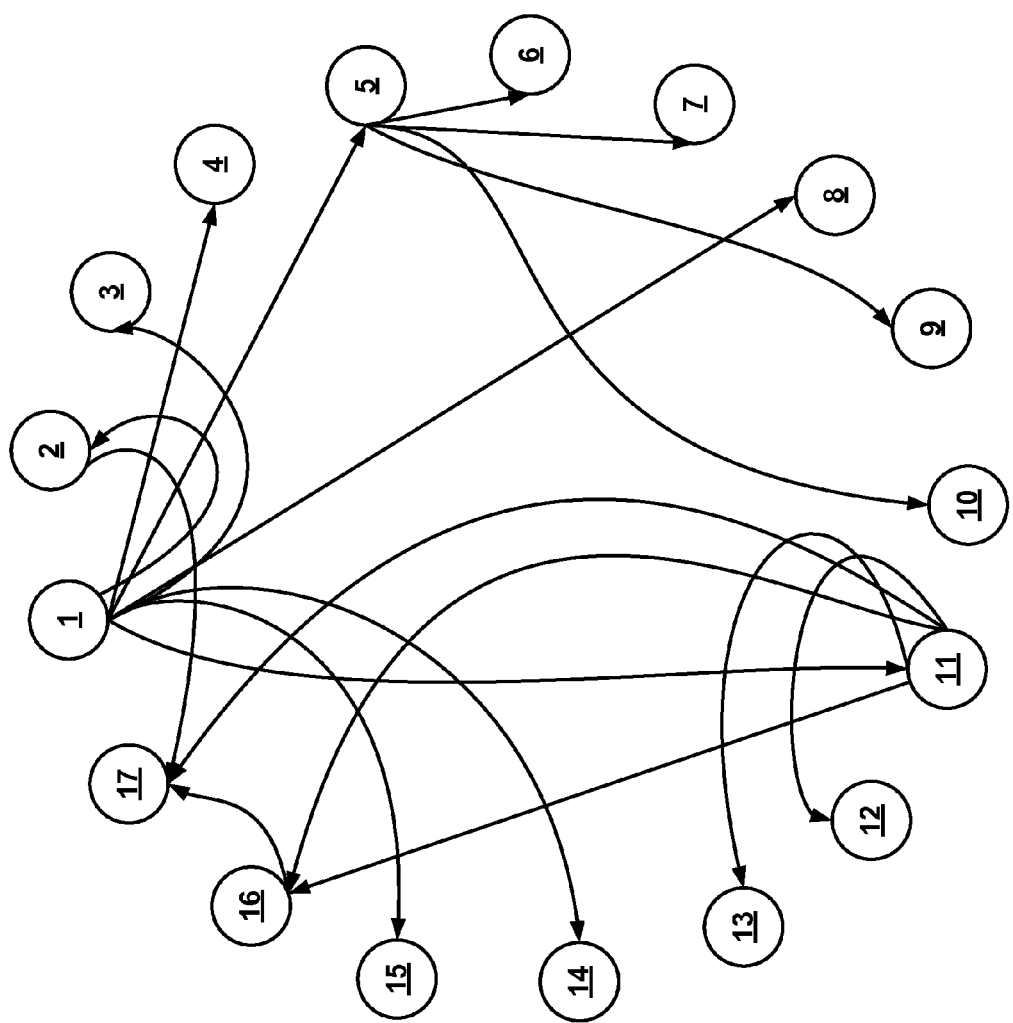
FIG. 1 is a block diagram of an exemplary graph visualization.

Embodiments of techniques for method and system for lane graph visualization are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. For example, reference to vertical or horizontal direction herein can be seen as a convention and changed when practicing the invention. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In various embodiments, raw data may be obtained, analyzed, and processed to produce a dependency graph. Raw data refers to data that is not modified or processed in any way and exists in a form that the data has been collected in.

In various embodiments, raw data may be processed to produce structured data. Structured data refers to data that has been analyzed and a structure of the elements of the data, or connections, or relationships between the data elements have been determined. For example, structured data may be database data, data found in reports, components in software packages and libraries, and others. Elements of structured data have relationships with other elements in the data. Relationships between elements are also referred to as 'dependencies.' Elements of structured data are also referred to as 'nodes' or 'data nodes.'

For example, in a corporate database, an 'employer' object (or table) can be related to one or more 'employee' objects. Thus, it can be determined that the 'employer' object has outgoing dependencies to the 'employee' objects; correspondingly, the 'employee' objects have incoming dependencies from the 'employer' object.

In another example, a software package includes modules that have dependencies between them. It may be beneficial to explore such dependencies to determine if conflicting dependencies exist, or if long dependency chains exist, and so on. If conflicting dependencies between modules exist, this may result in software applications failing or throwing errors. Likewise, if dependency is unknown, an error can be introduced.

Further, if a software application has a dependency to a small part of a bigger software library, it may be beneficial to analyze and optimize the dependencies to make the software application lighter and more portable.

If a software application has a long chain of dependencies, this may lead to the software application requiring a lot of external components to run. Such dependencies may require to be resolved manually. Thus, it may be beneficial to represent complex dependencies in a precise and readable way, so that such dependencies may be easily followed and resolved.

In various embodiments, a graph is a representation of one or more elements of data (e.g., nodes) where some elements may be connected. Hereinafter, 'nodes' and 'elements' are used interchangeably. A graph is defined by its nodes and its edges—connections, dependencies, relations, etc.

A node is an element in a graph. Nodes in graphs may have relationships (e.g., dependencies) between them. One or more nodes may be related to one or more other nodes, but not all nodes are necessarily related to one or more other nodes.

In various embodiments, nodes may be classified according to their dependencies. A root node is an element that has outgoing dependencies. A leaf node is a node that has incoming dependencies. An orphan node is a node that does not have incoming or outgoing dependencies.

In a directed graph, edges connecting nodes have a direction. For example, an edge connecting elements A and B directed from A to B means that A is the parent of B and B is the child of A. In a directed path from A to B to C, A is the ancestor of B and C; and B and C are descendents of A. In a graphical representation, directed edges of a graph are typically represented by arrows. In various embodiments, paths are also referred to as 'dependency flows.'

In various embodiments a node may have both incoming and outgoing dependencies. Therefore, a node may be a child of one or more other nodes and a parent of one or more other nodes.

Traversing a graph refers to visiting each node in a graph in a specific manner. In various embodiments, graphs may be traversed where each node in a graph is visited once. In various embodiments, graphs may be traversed where nodes are visited more than once.

An acyclic graph is a graph that does not have cycles, for example, when the graph is traversed following the flow of dependencies starting at any node in the graph, the node is never visited twice. If a directed graph has cycles, an algorithm may be used to break the cycles in the graph, thus producing an acyclic directed graph. A tree is a special form of a directed acyclic graph where all nodes have at most one parent.

FIG. 1 is a block diagram of an exemplary graph visualization. FIG. 1 is an exemplary acyclic directed graph of a data structure with 17 nodes. Referring to FIG. 1, nodes 1 through to 17 are displayed and each dependency is represented by a directed edge. For example, node 1 has edges directed to nodes 2-5, 8, 11, 14, and 15, indicating that node 1 is the parent of these nodes. However, such a visualization may be difficult to represent on a screen or paper and hard to understand and analyze if the graph has hundreds and thousands of nodes. Edge crossings can reduce the readability of the graph. Some graphs are non-planar and crossings can't be eliminated. Further, it may be difficult to follow dependency flows in the graph of FIG. 1.

In various embodiments, a topological sort may be performed on an acyclic directed graph. Following the topological sort, the nodes of an acyclic directed graph are reordered in topological order. Topological order refers to an ordering of nodes where each node is placed above any nodes to which it has outgoing edges, and below any nodes from which it has incoming edges. The run time of a common topological sort algorithm scales linearly with the sum of the number of nodes and edges.

Figure 2:
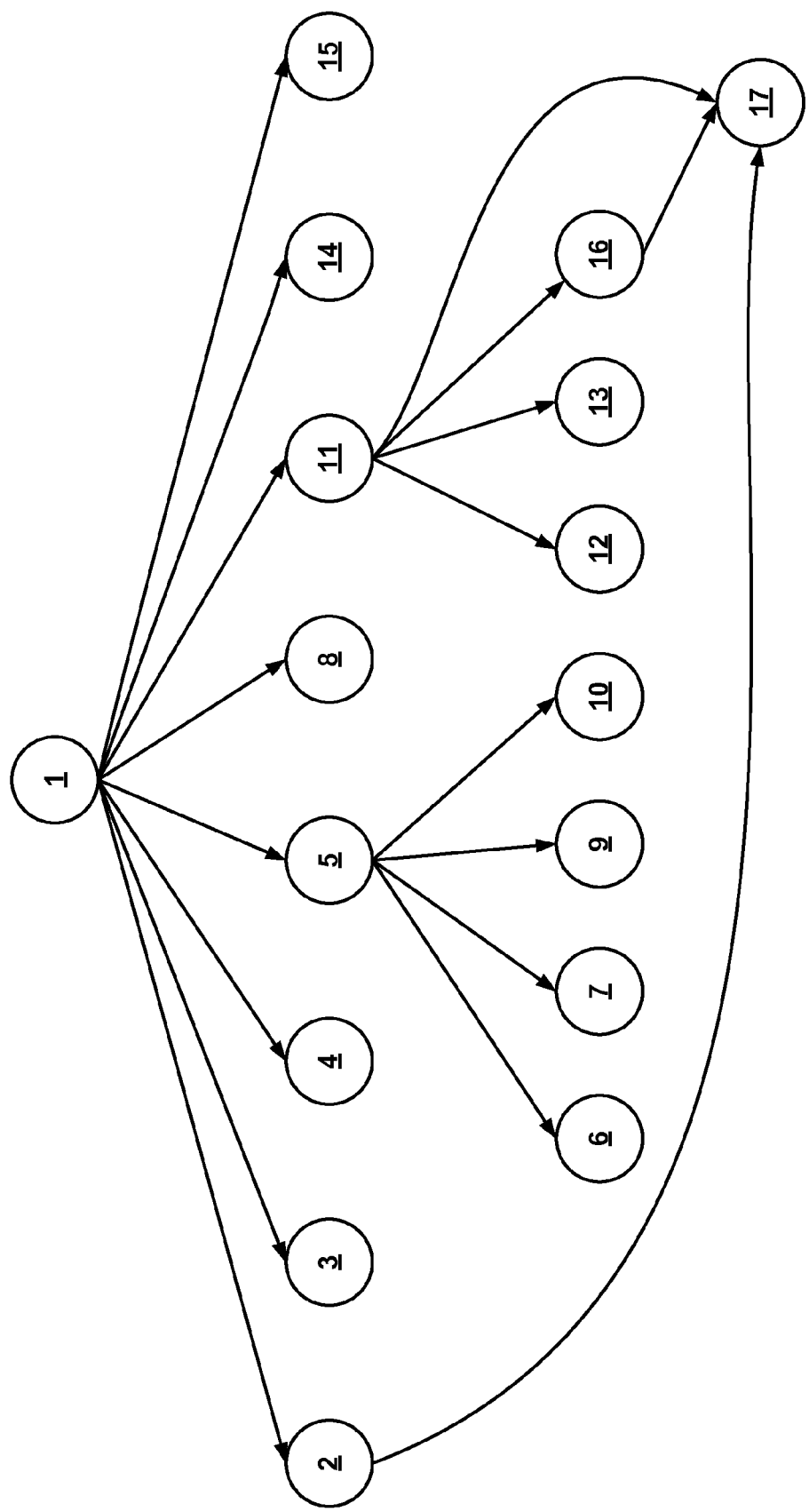
FIG. 2 is a block diagram of an exemplary graph visualization with topologically sorted nodes.

FIG. 2 is a block diagram of an exemplary graph visualization with topologically sorted nodes. FIG. 2 is an exemplary visualization of a topological sort of the nodes referred to in FIG. 1. Referring to FIG. 2, node 1 is represented above nodes 2 through to 17 because node 1 does not have incoming edges. Nodes 2 through to 5, 8, 11, 14, and 15 are represented below node 1 because they have incoming edges from node 1. Further, 2 through to 5, 8, 11, 14, and 15 are represented above nodes 6, 7, 9, 10, 12, 13, 16, and 17 because they have outgoing edges to nodes 6, 7, 9, 10, 12, 13, 16, and 17.

However, a visualization such as the visualization in FIG. 2 has a number of limitations. For example, such a visualization may not represent reverse dependencies or dependencies from the point of view of a specific node. To represent dependencies for a specific node, the visualization would have to reorder the nodes in the graph. Also, if the nodes in the graph are hundreds or thousands, it would be difficult to display nodes on a screen and follow dependencies between the nodes.

In various embodiments, a visualization may be created where nodes are assigned markers according to their type. A marker may be any graphical representation of a symbol that can specify the type of a node element. In various embodiments, each type of node element (e.g., root node, leaf node, and orphan node) may be assigned a marker.

Various embodiments include markers for different types of nodes, labels and arrows. In various embodiments, a root node may be assigned a marker representing a circle and a dash connected to the circle. In various embodiments, a leaf node may be assigned a marker representing a circle and a left-pointing arrow to the right side of the circle; thus, the marker indicates that the node has incoming dependencies. In various embodiments, labels may be assigned to nodes. In various embodiments, labels may be assigned to nodes from the names of the components in the data structure, or from table names in a database if the data structure describes tables in a database. In various embodiments, arrow markers may be assigned to specify dependencies of a node to other nodes.

In various embodiments, root and arrow markers specifying dependencies for a node may be connected by a vertical line and displayed in a vertical lane in a visualization. Hereinafter, the terms 'lane' and 'vertical lane' are used interchangeably. However, note that the use of a vertical lane selected by convention and may be culturally influenced.

Therefore, embodiments of the invention may include horizontal lanes or lanes in another direction.

Figure 3:
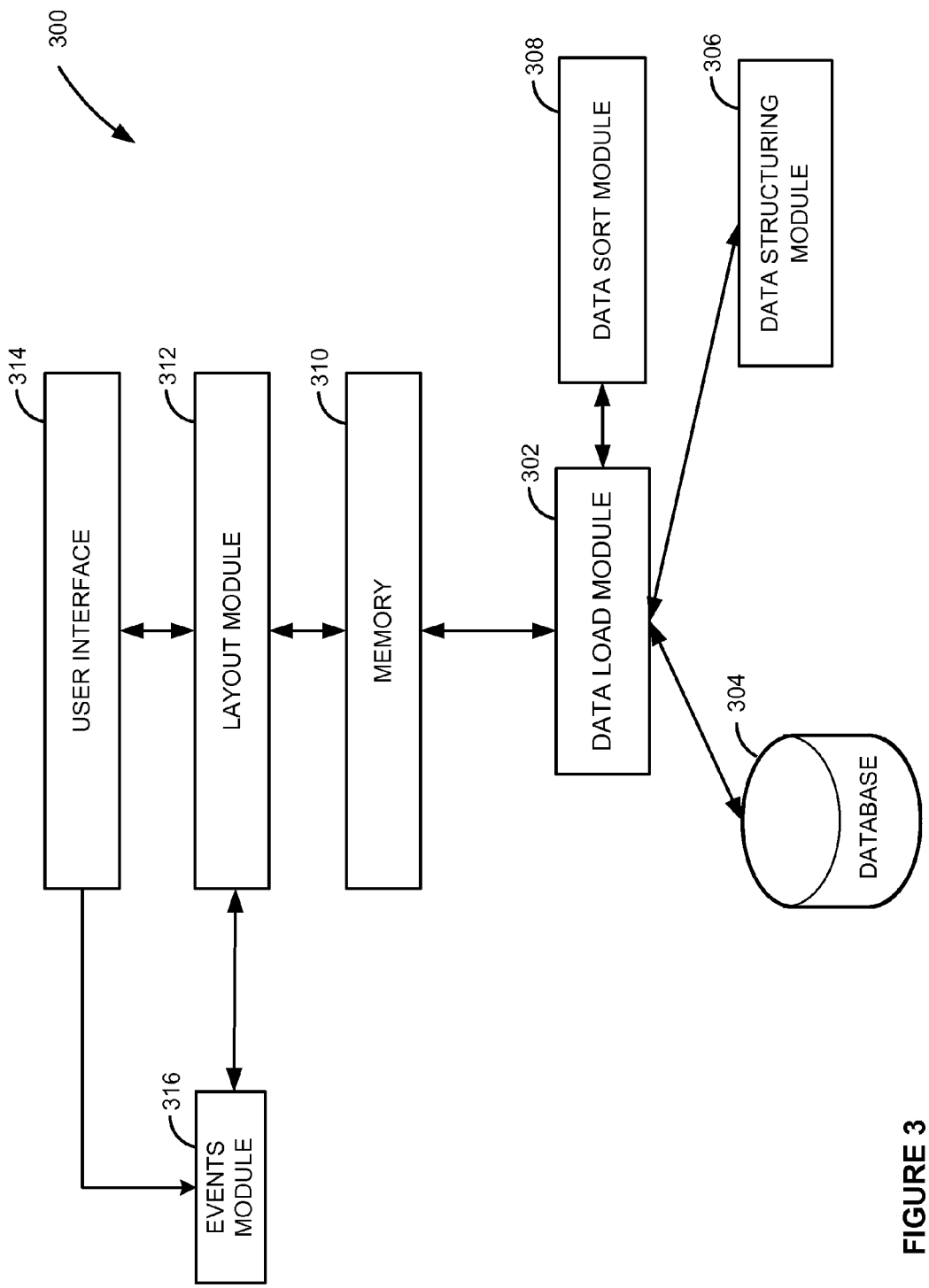
FIG. 3 is a block diagram of an embodiment of a system for creating a lane graph visualization.

FIG. 3 is a block diagram of an embodiment of a system for analyzing data and creating a lane graph visualization. The modules shown include optional modules. Referring to FIG. 3, a data load module 302 loads data from a database 304. The data load module 302 may check if the data is in a structured form. If the data is not in a structured form, the data load module 302 provides the data to the data structuring module 306 to process the data to a structured form. The data structuring module 306 may use one or more algorithms to analyze the data and transform the data in structured data. The data structuring module 306 provides the structured data to the data load module 302. The data load module 302 provides the structured data to the data sort module 308. The data sort module 308 may apply one or more algorithms to the structured data to sort the structured data in topological order. After the sort, the data sort module 308 provides the topologically sorted structured data to the data load module 302. The data load module loads the structured topologically sorted data in the memory 310. The layout module 312 receives the topologically sorted structured data from the memory 310 and starts an analysis to determine a visualization to send to the user interface 314. The layout module 312 analyzes the dependencies between the elements of the data loaded from the memory 310 and based on the dependencies determines a visualization to be provided to the user interface 314 and displayed on the user interface 314.

In various embodiments, the analysis performed by the layout module 312 may involve analyzing the types of elements in the data, such as, root nodes, leaf nodes, and orphan nodes. Further, the layout module 312 determines the dependencies of each element to other elements, if any. The layout module 312 may also determine user interface artifacts to assign to each element and each dependency. For example, each node may be assigned a marker according to the type of node. In another example, dependencies between elements may be represented by user interface artifacts and/or visual aids, such as, but not limited to colors, combinations of colors, and blocks.

In various embodiments, the layout module 312 may receive elements for the visualization from the events module 316. The events module 316 receives user interface events, such as mouse over events, keyboard events, mouse click events, selection events, and others. The events module 316 may offer additional functionality to be added to a lane graph visualization in response to received events.

For example, the events module 316 may receive a mouse over event and provide instructions to the layout module 312 to send an updated lane graph visualization to the user interface 314 in which lanes are highlighted. For example, lanes are shown in different colors depending on the type of dependencies the lanes are displaying a first color for outgoing dependencies and a second color for incoming dependencies. In another example, the events module 316 may receive a selection event for one or more lanes in a lane graph visualization and provide a collapse or expand feature for the selected lanes to be added to the lane graph visualization. The layout module 312 receives the provided features, updates the lane graph visualization, and sends the updated lane graph visualization to the user interface 314 for display. The events can be related to analysis, processing, and display of the underlying data for the graph.

Figure 4:
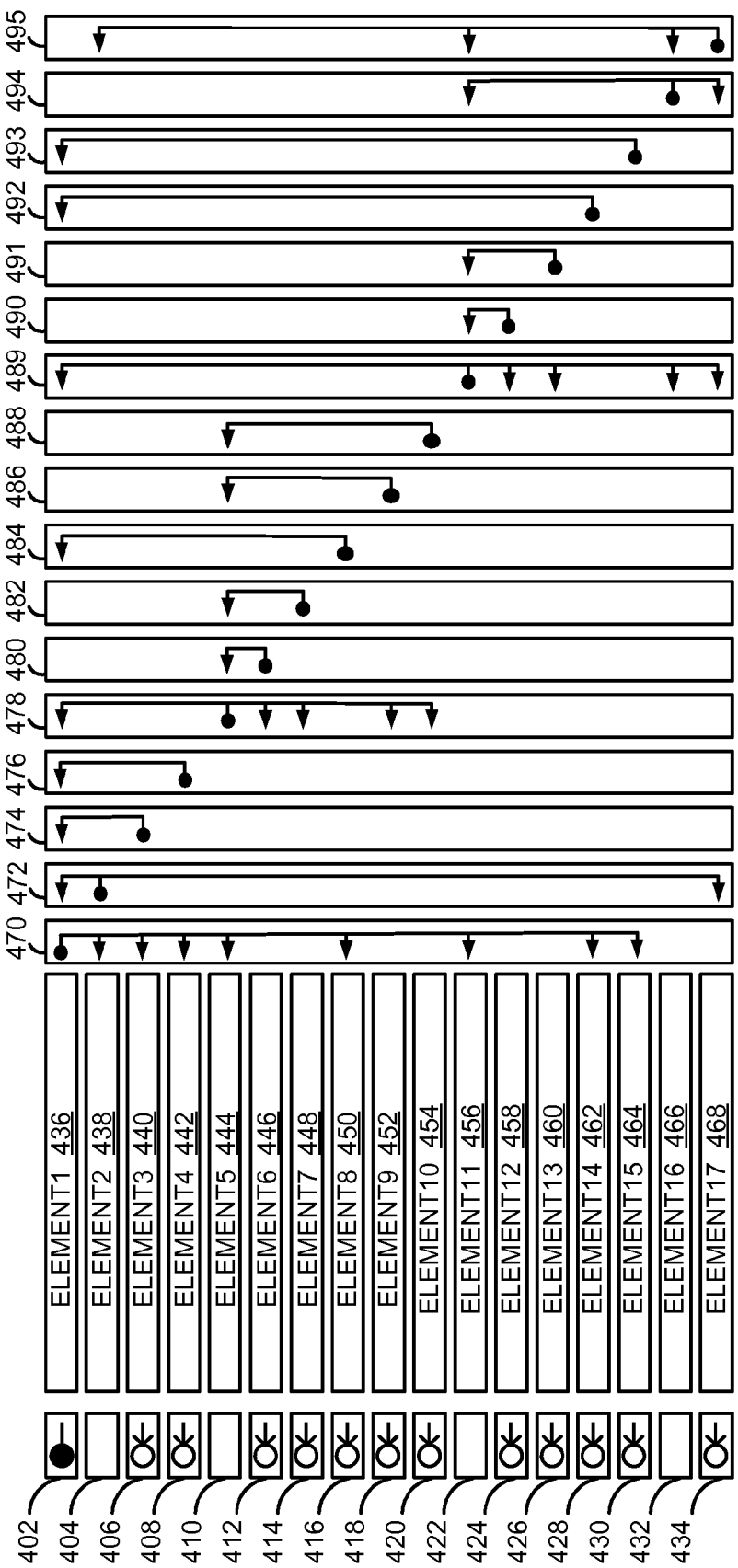
FIG. 4 is an exemplary lane graph visualization.

FIG. 4 is an exemplary lane graph visualization. In various embodiments, the exemplary lane graph visualization of FIG. 4 may be created by components as descried in FIG. 3. Referring to FIG. 4, the exemplary lane graph visualization represents the dependencies of elements (e.g., nodes). In this example, nodes 1 though to 17 of FIGS. 1 and 2 are shown in blocks 436 through to 468.

Each element is placed on a separate row and the label of the element is listed (e.g., 'element1,' 'element2,' and so on). The elements are sorted topologically (e.g., by the data sort module 308 of FIG. 3). Thus, each element appears above the elements it has outgoing dependencies to; and below each element it has incoming dependencies to. For example, Element1 in block 436 is placed on the first row. This means that Element1 in block 436 does not have any incoming dependencies, i.e. that it is the root node of the structure.

In various embodiments, complex lane graphs may exist where there is more than one root node.

Each element is assigned a marker related to the type of element, in blocks 402 through to 434. Block 402 represents a root node marker while blocks 406, 408, and others represent leaf node markers. To represent dependencies between elements 1 through to 17 in blocks 436 through to 468, the lane graph visualization includes a lane per each element. Lanes are placed in the order of placing the elements, that is, lane one 470 lists dependencies for Element 1 in block 436, and so on. The lanes 470 through to 495 represent a set of dependencies including markers to represent which node element is the root in the dependency and which node elements are the leaf nodes. For example, the lane 470 indicates that Element1 in block 436 is a root node and elements 2, 3, 4, 5, 8, 11, 14, and 15 in blocks 438-444, 450, 462, and 462 are leaf nodes and children of that node.

In various embodiments, a root node may be assigned a marker representing a filled circle and a dash connected to the circle. The dash may be replaced by an arrow (e.g., head, tail, or both) leading away from the circle, or some other symbol to imply leading away. The circle could be a box, the ground sign from electrical engineering, or some other symbol to imply ground.

In various embodiments, a leaf node may be assigned a marker representing a circle and a left-pointing arrow to the right side of the circle; thus, the marker indicates that the node has incoming dependencies.

In various embodiments, labels may be assigned to nodes. In various embodiments, labels may be assigned to nodes from the names of the components in the data structure, or from table names in a database if the data structure describes tables in a database.

In various embodiments, arrow markers may be assigned to specify dependencies of a node to other nodes.

In various embodiments, root and arrow markers specifying dependencies for a node may be connected by a vertical line and displayed in a vertical lane in a visualization.

Each lane 470 through to 495 includes a root marker correspondingly relevant for the label of the element in blocks 436 through to 468. The root marker in the lane specifies the node for which dependencies are shown in that lane. Thus, a lane graph visualization may show dependencies for all nodes in a data structure from the point of view of each node simultaneously. Because of the topological order of the nodes, the root markers in the vertical lanes form a diagonal path splitting the vertical lanes in two halves.

Because of the topological sorting of the elements, two regions are formed: a region with an outgoing flow of dependencies in the lower left side of the vertical lanes, and a region with incoming dependencies in the upper right side of the vertical lanes. These two regions are separated by a diagonal path formed by root markers indicating the node to which the dependencies are relevant for, as noted above.

For example, the lane 470 includes a root marker at the first row corresponding to block 436 to specify that this lane represents the dependencies of Element1 at block 436. Further, the lane includes arrows pointing to Element2 at block 438, Element3 at block 440, Element4 at block 442, Element5 at block 444, Element8 at block 450, Element11 at block 456, Element14 at block 462, and Element15 at block 464. Because the line connecting Element1 at block 436 is directed towards the lower side of the lane, it can be determined that Element1 at block 436 is the parent of Element2 at block 438, Element3 at block 440, Element4 at block 442, Element5 at block 444, Element8 at block 450, Element11 at block 456, Element14 at block 462, and Element15 at block 464. Further, each lane representing the dependencies per Element2 at block 438, Element3 at block 440, Element4 at block 442, Element5 at block 444, Element8 at block 450, Element11 at block 456, Element14 at block 462, and Element15 at block 464 reflects this dependency, too. For example, the lane 478 has a root marker corresponding to block 444 meaning that this lane represents the dependencies of Element5 at block 444. The lane 478 has an arrow pointing to block 436, indicating that Element5 at block 444 has an incoming dependency to its parent, Element1 at block 436. The lane 478 represents the reverse flow of the dependency shown in lane 470 from Element1 at block 436 to Element 5 at block 444. Further, the lane 478 has arrows pointing to Element6 at block 446, Element7 at block 448, Element9 at block 452, and Element10 at block 454, indicating that Element5 at block 444 is the parent of these nodes. Further, it can be determined that a path exists from Element 1 at block 436 to Element6 at block 446, Element7 at block 448, Element9 at block 452, and Element10 at block 454 via Element5 at block 444.

Therefore, a lane graph visualization such as the one on FIG. 4 is able to show dependencies of all nodes and from the standpoint of each node simultaneously.

In various embodiments, the data for the exemplary visualization may be loaded in a memory (e.g., memory 310 in FIG. 3), and the visualization may be generated by a layout module such as the layout module 312 of FIG. 3. The exemplary visualization may be displayed on a screen in a user interface (e.g., user interface 314 in FIG. 3).

Further, an events module (e.g., events module 316 of FIG. 3) may be used to provide additional functionality for the visualization, such as, but not limited to, expanding and collapsing of rows, and highlighting lanes, nodes, dependencies, or a combination of all. Additionally lanes or equivalently nodes may be moved around subject to the topological sort.

In various embodiments, an events module (e.g., events module 316 of FIG. 3) may provide interactivity functionality such as providing a user of the lane graph visualization an option to reverse dependency flows in the lane graph, an option to drag and drop data node labels at different positions in the lane graph visualization, an option to focus the lane graph visualization on outgoing dependencies only, or on incoming dependencies only, or to focus the lane graph visualization on a combination of both. Furthermore, the events module 316 may highlight connected nodes, lanes, or a combination of nodes and lanes in different colors.

Providing additional functionality may be beneficial for the analysis of visualizations representing data structures with many nodes and for decision making based on such visualizations. For example, if a data structure has many nodes, it may be beneficial to collapse some lanes and focus the analysis of the data on a specific region of the visualization. Thus, a visualization and the data represented by the visualization can be explored on a screen in a readable and accessible way.

Further, in a data structure with many nodes, it may be useful to highlight nodes and lanes in color according to type so that a user can easily distinguish between dependency flows.

Figure 5:
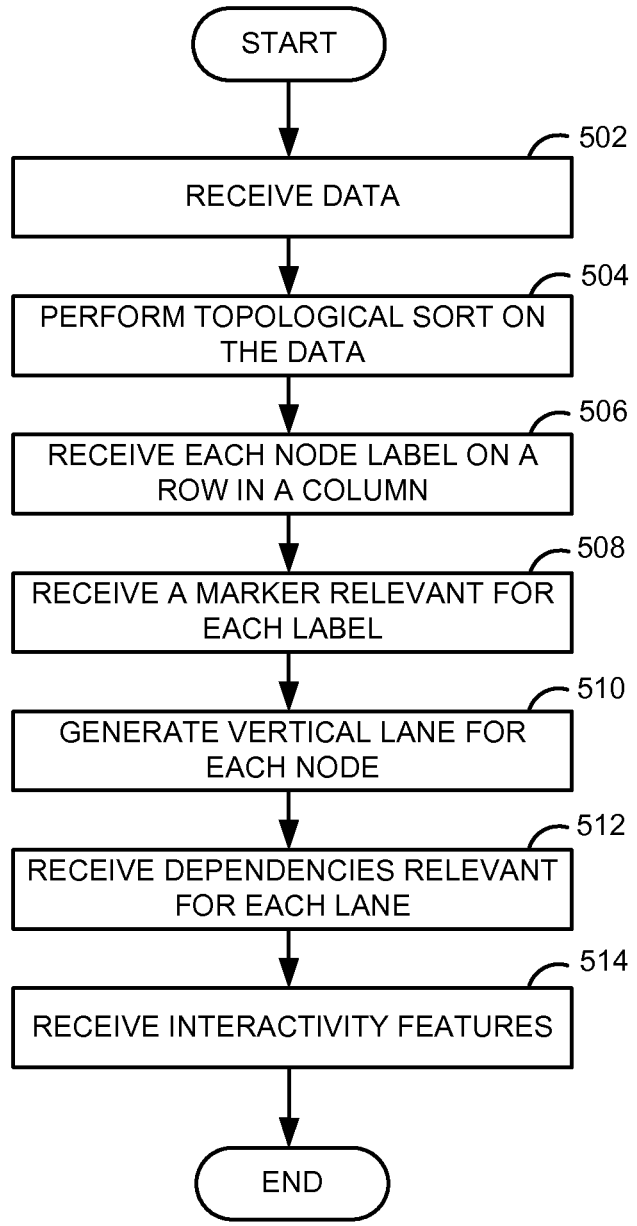
FIG. 5 is a flow diagram of an embodiment of a method for analyzing data and creating a lane graph visualization.

FIG. 5 is a flow diagram of an embodiment of a method for analyzing data and creating a lane graph visualization. In various embodiments, the method as described in FIG. 5 may be performed by components as described in FIG. 3. Referring to FIG. 5, at process block 502, data is received. At process block 504, a topological sort is performed on the data (e.g., by a data sorting module such as data sort module 308). A topological sort—each node comes before all nodes to which it has an outbound edge—can be implemented in linear time in the number of nodes and edges by performing a depth first search on the graph examining the edges incident on each node. As all the edges of a node have been checked add the nodes to the front of a linked list of nodes (e.g., a linked list, as known in the art, is a data structure where each node has a link to a subsequent node). Such a linked list will have a topological sort. Other methods to perform a sort are known in the art. The sort can be augmented, such that nodes with the fewest children (or descendents) are ranked ahead. However, the sort may remain in place so that each node comes before all nodes to which it has an outbound edge.

At process block 506, each node label for each node in the data is received. The labels are arranged in a column where each label occupies one row in the column. At process block 508, a marker for each label is received. The markers are arranged in a column where each marker is correspondingly relevant for each label and is placed on the row of the column next to that label. At process block 510, a vertical lane is generated per each node. The vertical lanes are generated in the same order as the labels.

In various embodiments, if a visualization is created for the first time, lanes are initially empty. In various embodiments, a visualization may be changed after its first creation, thus non-empty lanes will be re-filled with data.

At process block 512, dependencies relevant for each lane are received. At process block 514 interactivity features are received. In various embodiments, such interactivity features may be received from an events module (e.g., events module 316 of FIG. 3).

Figure 6:
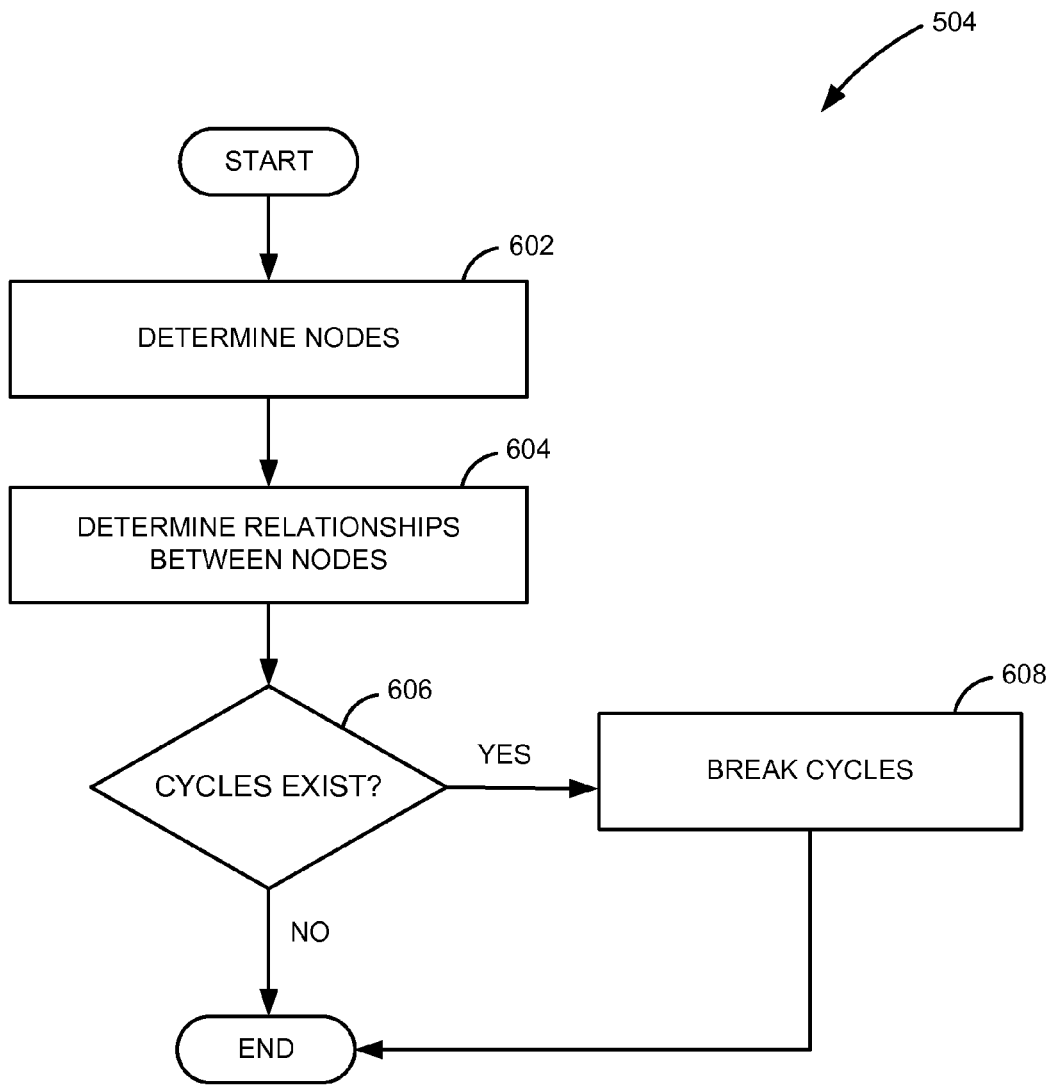
FIG. 6 is a flow diagram of an embodiment of a method for performing a topological sort of data.

FIG. 6 is a flow diagram of an embodiment of a method for performing a topological sort of data. Referring to FIG. 6, at process block 602, data nodes are determined. At process block 604, relationships (e.g., dependencies) between the determined data nodes are determined.

At process block 606, a check is performed to determine if cycles exist in the data structure of the data. There are many methods to test if a graph includes a cycle. One example method is performing a depth first search looking for edges directed from a descendent to an ancestor. If none are found, the graph is acyclic. At process block 608, the cycles are broken if at process block 606 the check determines that cycles exist. In various embodiments, one or more algorithms may be applied to break the cycles.

In various embodiments, to break cycles in a graph, a depth-first traversal of a graph may be performed in the following way. A stack may be created and a root node is added to the stack. While the stack is not empty, a node is taken from the stack, marked and its edges are received. If a target node of the node edge is marked, the edge is deleted. If the target node of the node edge is not marked, the target node is added to the stack. This process may be repeated until all nodes are traversed.

In various embodiments, the process as described in FIG. 6 may be performed by components as described in FIG. 3 (e.g. data sort module 308).

Figure 7:
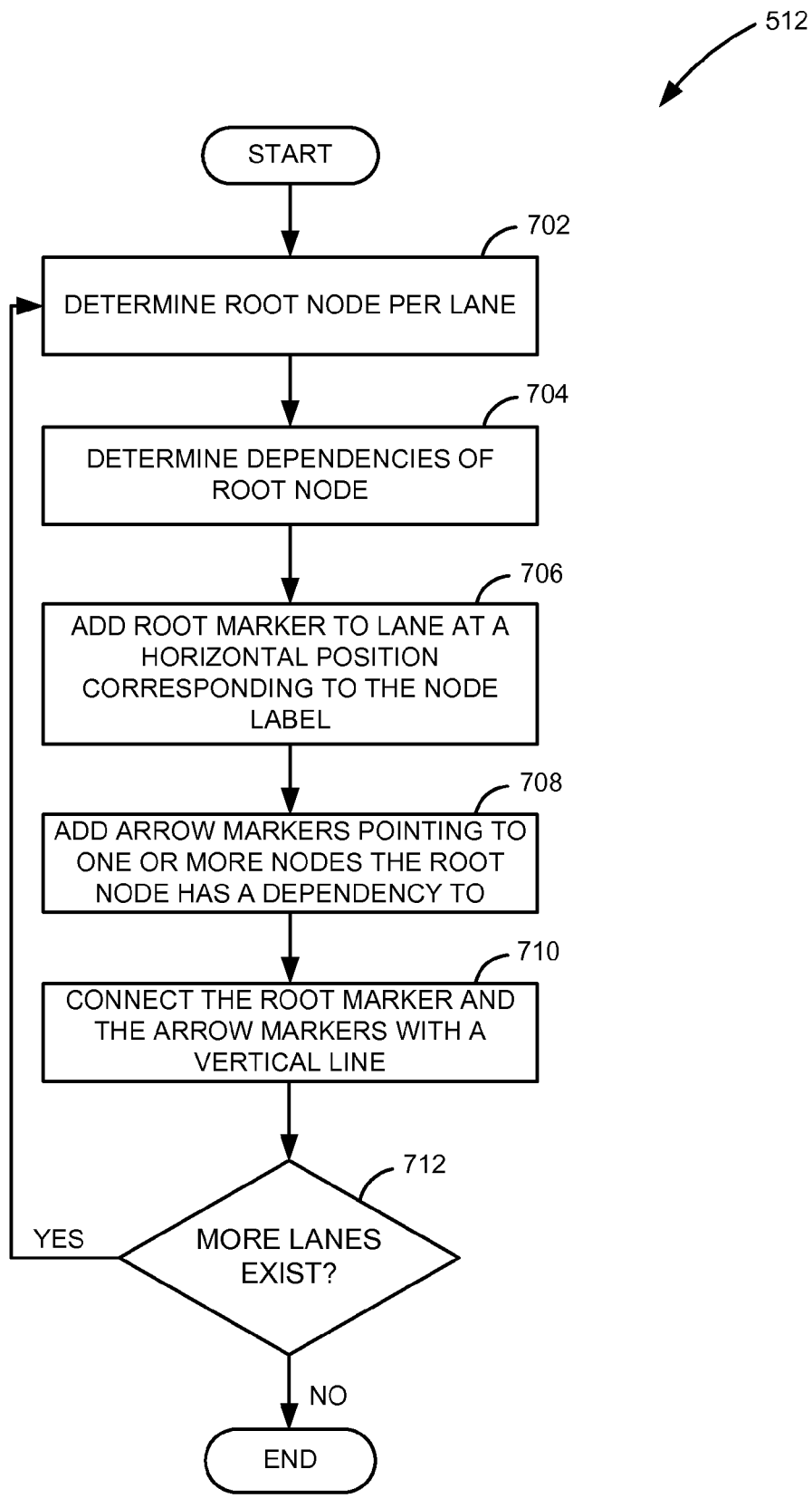
FIG. 7 is a flow diagram of an embodiment of a method for receiving dependencies for a data node.

FIG. 7 is a flow diagram of an embodiment for receiving dependencies for a data node. Referring to FIG. 7, at process block 702, a root node relevant for a lane is determined. At process block 704, the dependencies for the root node are determined. The root node relevant for the lane is the node for which the lane will represent dependencies for. Such dependencies may include outgoing dependencies which will be directed downward in a lane graph visualization or incoming dependencies which will be directed upward in a lane graph visualization, or a combination of both incoming and outgoing dependencies.

At process block 706, a root marker is added to the lane at a horizontal position corresponding to the label of the node. At process block 708, one or more arrow markers are added to the lane. The arrow markers are added to a horizontal position corresponding to the nodes the root node has dependencies to. At process block 710, the root marker and the one or more arrow markers in the lane are connected with a vertical line. The vertical line represents the flow of dependencies for the node. The part of the flow above the root marker represents incoming dependency flow and the part of the flow below the root marker represents outgoing dependency flow. At process block 712, a check is performed to determine if more lanes exist. If more lanes exist, dependencies are added for each additional lane.

In various embodiments, the process as described in FIG. 7 is performed by components as described in FIG. 3. (e.g., layout module 312 and user interface module 314).

Figure 8:
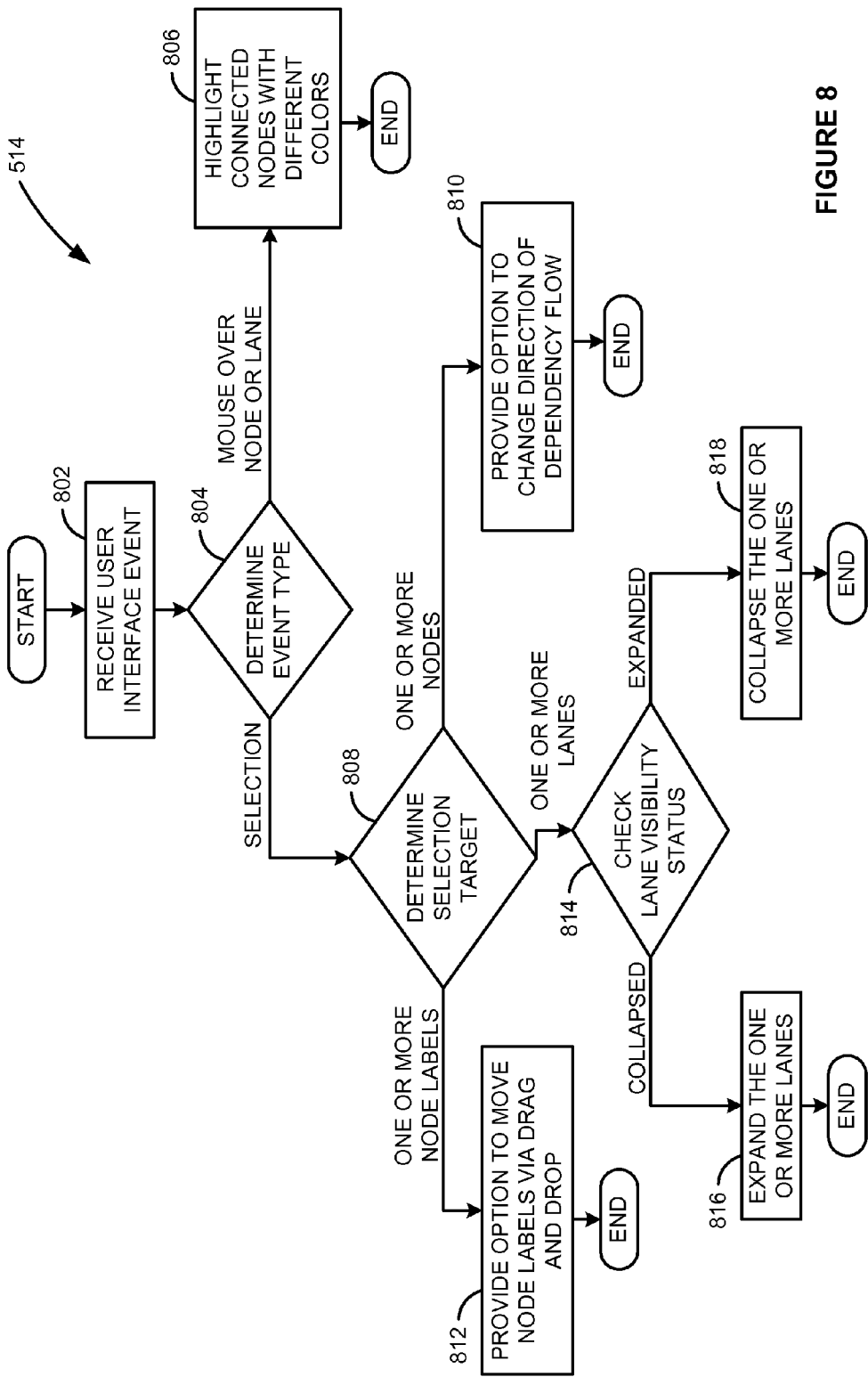
FIG. 8 is a flow diagram of an embodiment of a method for receiving interactivity features.

FIG. 8 is a flow diagram of an embodiment for receiving interactivity features. Referring to FIG. 8, at process block 802, a user interface event is received. At process block 804, a check is performed to determine the type of the received event. At process block 806, one or more nodes or lanes are highlighted, e.g., in different color, if the check at block 804 determines that the event is a mouse over event over a node or lane. At process block 808, a check is performed to determine a selection target if the check at block 804 determines that the event is a selection event. At process block 810, an option to change a direction of the flow of one or more dependencies is provided if the check at block 808 determines that the selection target is one or more nodes. At process block 812, an option to move node labels via drag and drop is provided if the check at block 808 determines that the selection target is one or more node labels.

At process block 814, a check is performed to determine lane visibility status if the check at block 808 determines that the selection target is one or more lanes. At process block 816, the one or more lanes are expanded if the check at block 814 determines that the lane visibility status is collapsed. At process block 818, the one or more lanes are collapsed if the check at block 814 determines that the lane visibility status is expanded.

In various embodiments, the process as described in FIG. 8 is performed by components as described in FIG. 3 (e.g., events module 316). The processing can be included at block 514 of the processing operations of FIG. 5.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any article that is capable of undergoing a set of changes to store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
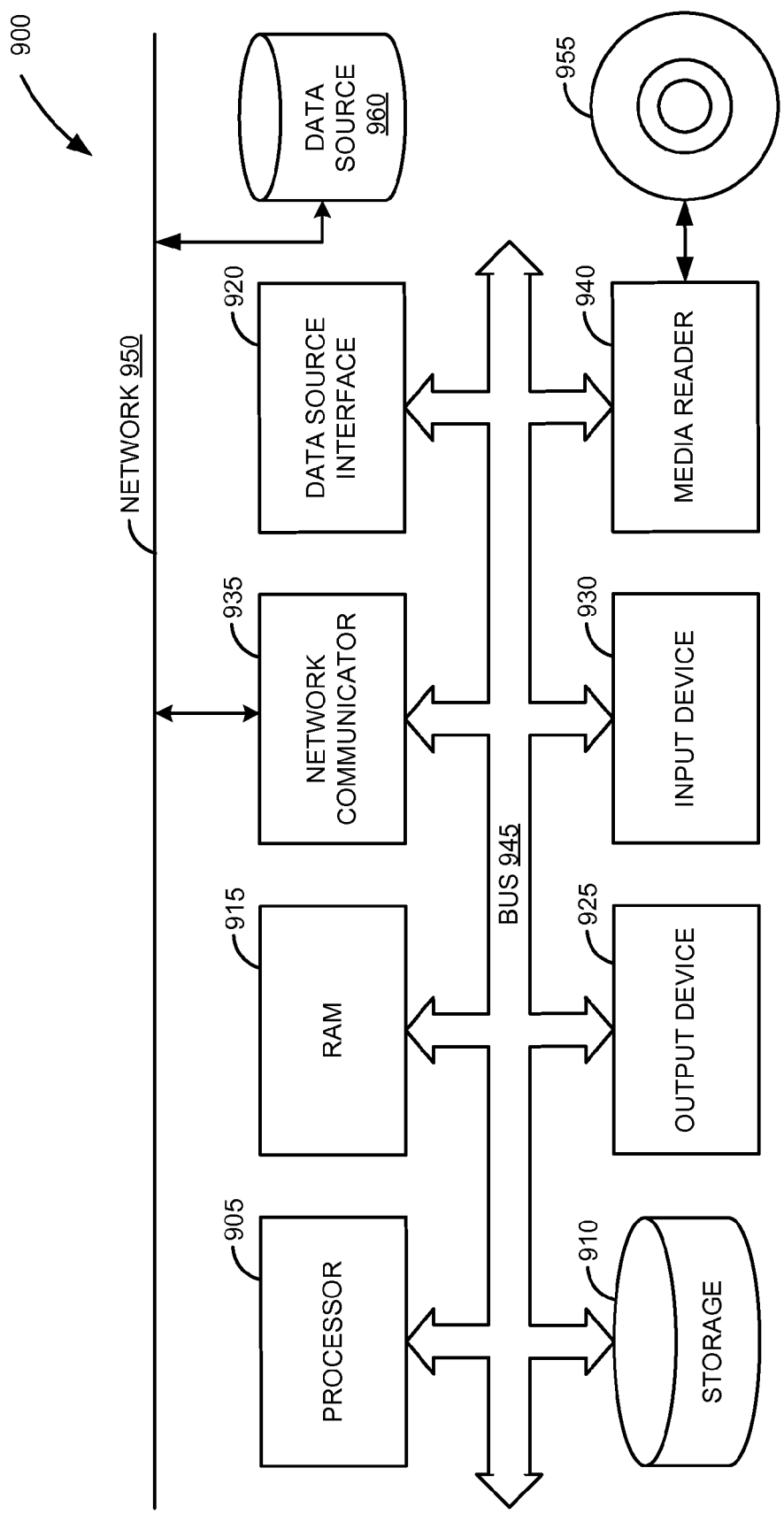
FIG. 9 is an exemplary block diagram of a system of an embodiment.

FIG. 9 is a block diagram of an exemplary computer system 900. The computer system 900 includes a processor 905 that executes software instructions or code stored on a computer readable medium 955 to perform the above-illustrated methods of the invention. The computer system 900 includes a media reader 940 to read the instructions from the computer readable medium 955 and store the instructions in storage 910 or in random access memory (RAM) 915. The storage 910 provides a large space for keeping static data where at least some instructions could be stored for later execution. The stored instructions may be further compiled to generate other representations of the instructions and ally stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be access via one or more abstraction layers implemented in hardware or software. For example, the data source 960 may be access by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, one or more reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A non-transitory computer-readable storage device having computer readable instructions tangibly stored thereon which when executed by the computer, cause the computer to perform a method for graph visualization, the method comprising:
    defining:
        a plurality of lanes, wherein there is one lane for each node of a plurality of nodes in a graph, wherein the plurality of nodes and the plurality of lanes are topologically sorted;
        a plurality of markers placed one marker per lane representing the plurality of nodes of the graph defining a diagonal across the lanes;
        a first region of the plurality of lanes on a first side of the diagonal, denoting association to a first set of nodes with an incoming dependency;
        a second region of the plurality of lanes on a second side of the diagonal, denoting association to a second set of nodes with an outgoing dependency;
        a first arrow originating at a first marker in the plurality of markers and extending within the associated lane into the first region terminating at a first location associated with a parent node of a first node represented by the first marker; and
        a second arrow originating at a second marker in the plurality of markers and extending within the associated lane into the second region terminating at a second location associated with a child node of the second node represented by the second marker; and
    displaying the plurality of lanes, the plurality of markers, the first arrow, and the second arrow as a graph visualization in a user interface display.

2. The computer-readable storage device of claim 1, wherein the method further comprises:
    receiving the plurality of nodes;
    determining incoming and outgoing dependencies between the plurality of nodes;
    assigning a position to a first node of the plurality of nodes based on the incoming and outgoing dependencies.

3. The computer-readable storage device of claim 1, wherein the method further comprises receiving one or more interactivity features.

4. The computer-readable storage device of claim 3, wherein receiving the one or more interactivity features comprises:
    receiving a user interface event;
    determining a type relevant for the user interface event;
    highlighting a subset of the plurality of nodes with different colors, when the type relevant for the user interface event is a mouse over event;
    determining a target relevant for a selection, when the type relevant for the user interface event is the selection;
    providing an option to drag and drop a plurality of labels associated with the plurality of nodes, when the target relevant for the selection is one or more of the plurality of labels associated with the plurality of nodes; and
    providing an option to collapse one or more dependency flows of one or more of the plurality of nodes, when the target relevant for the selection is one or more of the plurality of nodes.

5. The computer-readable storage device of claim 4, wherein the method further comprises:
    determining a visibility status of one or more of the plurality of lanes, when the target relevant for the selection is one or more of the plurality of lanes;
    expanding the one or more of the plurality of lanes, when the visibility status of the one or more of the plurality of lanes is collapsed; and
    collapsing the one or more of the plurality of lanes, when the visibility status of the one or more of the plurality of lanes is expanded.

6. The computer-readable storage device of claim 1, wherein the method further comprises:
    displaying a plurality of labels associated with the plurality of nodes by placing a label of the plurality of labels associated with a node of the plurality of nodes on a row in a column.

7. A computerized system for graph visualization, the system comprising:
    a processor; and
    a memory in communication with the processor, the memory storing instructions related to:
        a data load module operable to receive a plurality of nodes from a database;
        a layout module operable to receive the plurality of nodes from the data load module; and
        a user interface operable to:
            define:
                a plurality of lanes, wherein there is one lane for each node of a plurality of nodes in a graph, wherein the plurality of nodes and the plurality of lanes are topologically sorted;

a plurality of markers placed one marker per lane representing the plurality of nodes of the graph defining a diagonal across the lanes;

a first region of the plurality of lanes on a first side of the diagonal, denoting association to a first set of nodes with an incoming dependency;

a second region of the plurality of lanes on a second side of the diagonal, denoting association to a second set of nodes with an outgoing dependency;

a first arrow originating at a first marker in the plurality of markers and extending within the associated lane into the first region terminating at a first location associated with a parent node of a first node represented by the first marker; and a second arrow originating at a second marker in the plurality of markers and extending within the associated lane into the second region terminating at a second location associated with a child node of the second node represented by the second marker; and display the plurality of lanes, the plurality of markers, the first arrow, and the second arrow as a graph visualization in a user interface display.

8. The computerized system of claim 7, wherein the data load module is further operable to:

receive the plurality of nodes;

determine incoming and outgoing dependencies between the plurality of nodes;

assign a position to a first node of the plurality of nodes based on the incoming and outgoing dependencies.

9. The computerized system of claim 7, further comprising an events module operable to:

receive one or more interactivity features.

10. The computerized system of claim 9, wherein the events module is further operable to:

receive a user interface event;

determine a type relevant for the user interface event;

highlight a subset of the plurality of nodes with different colors, when the type relevant for the user interface event is a mouse over event;

determine a target relevant for a selection, when the type relevant for the user interface event is the selection;

provide an option to drag and drop a plurality of labels associated with the plurality of nodes, when the target relevant for the selection is one or more of the plurality of labels associated with the plurality of nodes; and provide an option to collapse one or more dependency flows of one or more of the plurality of nodes, when the target relevant for the selection is one or more of the plurality of nodes.

11. The computerized system of claim 10, wherein the user interface is further operable to:

determine a visibility status of one or more of the plurality of lanes, when the target relevant for the selection is one or more of the plurality of lanes;

expand the one or more of the plurality of lanes, when the visibility status of the one or more of the plurality of lanes is collapsed; and collapse the one or more of the plurality of lanes, when the visibility status of the one or more of the plurality of lanes is expanded.

12. The computerized system of claim 7, wherein the user interface is further operable to:

display a plurality of labels associated with the plurality of nodes by placing a label of the plurality of labels associated with a node of the plurality of nodes on a row in a column.

13. A computerized method performed by a processor for graph visualization, comprising: defining: a plurality of lanes, wherein there is one lane for each node of a plurality of nodes in a graph, wherein the plurality of nodes and the plurality of lanes are topologically sorted; a plurality of markers placed one marker per lane representing the plurality of nodes of the graph defining a diagonal across the lanes; a first region of the plurality of lanes on a first side of the diagonal, denoting association to a first set of nodes with an incoming dependency; a second region of the plurality of lanes on a second side of the diagonal, denoting association to a second set of nodes with an outgoing dependency; a first arrow originating at a first marker in the plurality of markers and extending within the associated lane into the first region terminating at a first location associated with a parent node of a first node represented by the first marker; and a second arrow originating at a second marker in the plurality of markers and extending within the associated lane into the second region terminating at a second location associated with a child node of the second node represented by the second marker; and displaying the plurality of lanes, the plurality of markers, the first arrow, and the second arrow as a graph visualization in a user interface display.

14. The method of claim 13, further comprising:

receiving the plurality of nodes;

determining incoming and outgoing dependencies between the plurality of nodes;

assigning a position to a first node of the plurality of nodes based on the incoming and outgoing dependencies.

15. The method of claim 13, further comprising receiving one or more interactivity features.

16. The method of claim 15, wherein receiving the one or more interactivity features comprises:

receiving a user interface event;

determining a type relevant for the user interface event;

highlighting a subset of the plurality of nodes with different colors, when the type relevant for the user interface event is a mouse over event;

determining a target relevant for a selection, when the type relevant for the user interface event is the selection;

providing an option to drag and drop a plurality of labels associated with the plurality of nodes, when the target relevant for the selection is one or more of the plurality of labels associated with the plurality of nodes; and providing an option to collapse one or more dependency flows of one or more of the plurality of nodes, when the target relevant for the selection is one or more of the plurality of nodes.

17. The method of claim 16, further comprising:

determining a visibility status of one or more of the plurality of lanes, when the target relevant for the selection is one or more of the plurality of lanes;

expanding the one or more of the plurality of lanes, when the visibility status of the one or more of the plurality of lanes is collapsed; and collapsing the one or more of the plurality of lanes, when the visibility status of the one or more of the plurality of lanes is expanded.

18. The method of claim 13, further comprising:

displaying a plurality of labels associated with the plurality of nodes by placing a label of the plurality of labels associated with a node of the plurality of nodes on a row in a column.

* * * * *